United States Patent
Lupo et al.

(10) Patent No.: US 11,727,229 B1
(45) Date of Patent: Aug. 15, 2023

(54) RE-SCAN DETECTION AT SELF-CHECK-OUT MACHINES

(71) Applicant: ZEBRA TECHNOLOGIES CORPORATION, Lincolnshire, IL (US)

(72) Inventors: Francesco Lupo, London (GB); Andrea Bordone Molini, London (GB); Andrea Mirabile, London (GB)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

(21) Appl. No.: 17/679,923

(22) Filed: Feb. 24, 2022

(51) Int. Cl.
*G06K 7/10* (2006.01)
*G06K 7/14* (2006.01)
*G06V 40/10* (2022.01)

(52) U.S. Cl.
CPC ....... *G06K 7/10722* (2013.01); *G06K 7/1413* (2013.01); *G06V 40/107* (2022.01)

(58) Field of Classification Search
CPC ................................................. G06K 7/10722
USPC ..................................................... 235/462.14
See application file for complete search history.

(56) References Cited

U.S. PATENT DOCUMENTS

2021/0264215 A1\* 8/2021 Barkan .................. G06V 30/12
2021/0295078 A1\* 9/2021 Barkan .............. G06V 30/2247

\* cited by examiner

*Primary Examiner* — Toan C Ly
(74) *Attorney, Agent, or Firm* — Yuri Astvatsaturov

(57) ABSTRACT

A method and system for operating an indicia reader are disclosed herein. An example method includes detecting a first object in the scanning region; capturing one or more images of the first object to create first image data; determining that a successful decode of an indicia has not occurred; retrieving the first image data of the first object; generating, using the first image data, an embedding of the first image data; detecting a second object in the scanning region; retrieving one or more support samples from an image database; comparing the embedding of the image data to each support sample of the one or more support samples; based on the comparison that the embedding of the image data does not match any support sample, performing an operation.

38 Claims, 5 Drawing Sheets

RE-SCAN DETECTION AT SELF-CHECK-OUT MACHINES

BACKGROUND

Self-checkout scanning devices provide greater flexibility and speed for customers in a retail location. However, the introduction of self-checkout devices also lead to greater risk on the part of the retail location, as the self-checkout device removes a human element for determining when a potential bad-faith actor is stealing or otherwise obtaining an item from the retail location without proper payment. To address this concern, current self-checkout machines utilize a scale to determine when an object is added without a proper decode and register of the object for payment. However, such scales are large, bulky, and expensive.

Accordingly, there is a need for improved systems, methods, and devices which address these issues.

SUMMARY

In an embodiment, the present invention is a method for operating an indicia reader, the indicia reader having a scanning region and a controller communicatively coupled to a memory. The method includes: detecting, by the controller, a first object in the scanning region; capturing one or more images of the first object to create first image data associated with the first object, the first image data being stored in the memory; determining that a successful decode of an indicia associated with the first object has not occurred; responsive to the determining, retrieving the first image data associated with the first object from the memory; generating, using the first image data, an embedding of the first image data; detecting, by the controller, a second object in the scanning region; retrieving one or more support samples from an image database, wherein each support sample is an embedding of second image data associated with an object class based on the second object; comparing the embedding of the first image data to each support sample of the one or more support samples; and responsive to determining, based on the comparing, that the embedding of the first image data does not match any of the each support sample of the one or more support samples, performing at least one of: (i) generating an alert, (ii) preventing a transaction from being finalized, (iii) preventing a subsequent scan event, or (iv) logging a determination of an object mismatch.

In a variation of this embodiment, determining that the successful decode of the indicia associated with the first object has not occurred includes: receiving, from the controller, an indication at least one of (i) that a predetermined period of time has passed, since detecting the first object, without the successful decode of the indicia, or (ii) that the first object is no longer detected in the scanning region and that the successful decode of the indicia has not occurred; and determining, based on the indication, that at least one of a time-out failure or a scan failure has occurred.

In yet another variation of this embodiment, the method further comprises: responsive to receiving the first image data, cropping the first image data to obtain cropped image data; wherein the generating the embedding of the first image uses the cropped image data.

In still yet another variation of this embodiment, the method further comprises: calculating coordinates for a bounding box at least partially encompassing the first object in the first image data; wherein the cropping is based one calculating the coordinates and includes cropping the image data based on the bounding box.

In another variation of this embodiment, the method further comprises calculating coordinates for a first bounding box at least partially encompassing the first object in the first image data; identifying a hand in the first image data; and calculating coordinates for a second bounding box at least partially encompassing the hand in the first image data; wherein the cropping is based on the coordinates for the first bounding box and the coordinates for the second bounding box, and wherein the cropping includes cropping the first image data based on the first bounding box and the second bounding box.

In yet another variation of this embodiment, the method further comprises: determining that the second bounding box does not overlap with more than a predetermined threshold proportion of the first bounding box.

In still yet another variation of this embodiment, the retrieving the first image data includes retrieving a first set of first image data, the method further comprising: determining that the second bounding box overlaps with more than a predetermined threshold proportion of the first bounding box; and responsive to the determining that the second bounding box overlaps with more than the predetermined threshold proportion of the first bounding box, retrieving a second set of first image data of the first object; wherein the cropping the first image data is cropping the second set of first image data.

In another variation of this embodiment, the retrieving the first image data includes retrieving a first set of first image data, the method further comprising: determining that the second bounding box overlaps with more than a predetermined threshold proportion of the first bounding box; responsive to the determining that the second bounding box overlaps with more than the predetermined threshold proportion of the first bounding box, indicating, to a user, to scan the first object again; and retrieving a second set of first image data of the first object from the memory; wherein the cropping the first image data is cropping the second set of first image data.

In yet another variation of this embodiment, a neural network calculates the coordinates for the bounding box, the method further comprising: training, using a labelled dataset, the neural network to calculate the coordinates of the bounding box.

In still yet another variation of this embodiment, a neural network calculates the coordinates for the first bounding box and calculates the coordinates for the second bounding box, the method further comprising: training, using a first labelled dataset, the neural network to calculate the coordinates for the first bounding box; and training, using a second labelled dataset, the neural network to calculate the coordinates for the second bounding box.

In another variation of this embodiment, the method further comprises: determining a successful decode of an indicia associated with the second object has occurred; wherein the retrieving the one or more support samples from the image database is based on a decoded barcode of the second object.

In yet another variation of this embodiment, the generating the embedding of the first image data includes: converting pixels of the first image data into a mathematical array; wherein each entry of the mathematical array corresponds to visual details of one or more pixels of the pixels.

In still yet another variation of this embodiment, the method further comprises: responsive to the converting the pixels of the first image data into the mathematical array, compressing a size of the mathematical array.

In another variation of this embodiment, the method further comprises: determining, using the embedding of the first image data, whether the first object is covered.

In yet another variation of this embodiment, the first object is covered, the first image data is a first set of first image data, and the embedding of the first image data is a first embedding of the first image data, the method further comprising: indicating, to a user, to scan the first object again; retrieving a second set of first image data from the memory; and generating, using the second set of first image data, a second embedding of the second set of first image data; wherein the comparing the embedding of the first image data is comparing the second embedding of the second set of first image data.

In still yet another variation of this embodiment, a neural network converts the pixels of the first image data into the mathematical array, further comprising: training, using a labelled dataset, the neural network to generate the embedding of the first image data.

In another variation of this embodiment, the labelled dataset includes a plurality of sets of training image data, and the training the neural network includes: receiving designations between a subset of the plurality of sets of training image data based on similarity; and determining a distance for each node of the neural network from a seed node based on the designations.

In yet another variation of this embodiment, the comparing the embedding of the first image data to each support sample of the one or more support samples includes: calculating a difference between the embedding of the first image data and each support sample of the one or more support samples; and determining whether the difference between the embedding of the first image data and any of the each support sample of the one or more support samples is below a predetermined threshold.

In still yet another variation of this embodiment, a neural network compares the embedding of the first image data to each support sample of the one or more support samples, and the calculating the difference includes: calculating a distance between a seed node representing the embedding of the first image data and each node representing each support sample of the one or more support samples.

In another embodiment, the present invention is an imaging system for operating an indicia reader. The imaging system includes the indicia reader, wherein the indicia reader has a scanning region and a controller communicatively coupled to a memory; and a microprocessor and computer-readable media storing machine readable instructions that, when executed, cause the microprocessor to: detect, by the controller, a first object in the scanning region; capture one or more images of the first object to create first image data associated with the first object, the first image data being stored in the memory; determine that a successful decode of an indicia associated with the first object has not occurred; responsive to the determining, retrieve the first image data associated with the first object from the memory; generate, using the first image data, an embedding of the first image data; detect by the controller, a second object in the scanning region; retrieve one or more support samples from an image database, wherein each support sample is an embedding of second image data associated with an object class based on the second object; compare the embedding of the first image data to each support sample of the one or more support samples; and responsive to determining, based on the comparing, that the embedding of the first image data does not match any of the each support sample of the one or more support samples, perform at least one of: (i) generating an alert, (ii) preventing a transaction from being finalized, (iii) preventing a subsequent scan event, or (iv) logging a determination of an object mismatch.

In a variation of this embodiment, the determining that the successful decode of the indicia associated with the first object has not occurred includes: receiving, from the controller, an indication at least one of (i) that a predetermined period of time has passed, since detecting the first object, without the successful decode of the indicia, or (ii) that the first object is no longer detected in the scanning region and that the successful decode of the indicia has not occurred; and determining, based on the indication, that at least one of a time-out failure or a scan failure has occurred.

In yet another variation of this embodiment, the computer-readable media further stores machine readable instructions that, when executed, cause the microprocessor to: responsive to receiving the first image data, crop the first image data to obtain cropped image data; wherein the generating the embedding of the first image data uses the cropped image data.

In still yet another variation of this embodiment, the computer-readable media further stores machine readable instructions that, when executed, cause the microprocessor to: calculate coordinates for a bounding box at least partially encompassing the first object in the first image data; wherein the cropping is based on calculating the coordinates and includes cropping the image data based on the bounding box.

In another variation of this embodiment, the computer-readable media further stores machine readable instructions that, when executed, cause the microprocessor to: calculate coordinates for a first bounding box at least partially encompassing the first object in the first image data; identify a hand in the first image data; and calculate coordinates for a second bounding box at least partially encompassing the hand in the first image data; wherein the cropping is based on the coordinates for the first bounding box and the coordinates for the second bounding box, and wherein the cropping includes cropping the first image data based on the first bounding box and the second bounding box.

In yet another variation of this embodiment, the computer-readable media further stores machine readable instructions that, when executed, cause the microprocessor to: determine that the second bounding box does not overlap with more than a predetermined threshold proportion of the first bounding box.

In still yet another variation of this embodiment, the retrieving the first image data includes retrieving a first set of first image data and the computer-readable media further stores machine readable instructions that, when executed, cause the microprocessor to: determine that the second bounding box overlaps with more than a predetermined threshold proportion of the first bounding box; and responsive to the determining that the second bounding box overlaps with more than the predetermined threshold proportion of the first bounding box, retrieve a second set of first image data of the first object; wherein the cropping the first image data is cropping the second set of first image data.

In another variation of this embodiment, the retrieving the first image data includes retrieving a first set of first image data and the computer-readable media further stores machine readable instructions that, when executed, cause the microprocessor to: determine that the second bounding box overlaps with more than a predetermined threshold proportion of the first bounding box; responsive to the determining that the second bounding box overlaps with more than the predetermined threshold proportion of the first bounding box, indicate, to a user, to scan the first object again; and retrieve a second set of first image data of the first object from the memory; wherein the cropping the first image data is cropping the second set of first image data.

In yet another variation of this embodiment, a neural network calculates the coordinates for the bounding box and the computer-readable media further stores machine readable instructions that, when executed, cause the microprocessor to: train, using a labelled dataset, the neural network to calculate the coordinates of the bounding box.

In still yet another variation of this embodiment, a neural network calculates the coordinates for the first bounding box and calculates the coordinates for the second bounding box, and the computer-readable media further stores machine readable instructions that, when executed, cause the microprocessor to: train, using a first labelled dataset, the neural network to calculate the coordinates for the first bounding box; and train, using a second labelled dataset, the neural network to calculate the coordinates for the second bounding box.

In another variation of this embodiment, the computer-readable media further stores machine readable instructions that, when executed, cause the microprocessor to: determine a successful decode of an indicia associated with the second object has occurred; wherein the retrieving the one or more support samples from the image database is based on a decoded barcode of the second object.

In yet another variation of this embodiment, the generating the embedding of the first image data includes: converting pixels of the first image data into a mathematical array; wherein each entry of the mathematical array corresponds to visual details of one or more pixels of the pixels.

In still yet another variation of this embodiment, the computer-readable media further stores machine readable instructions that, when executed, cause the microprocessor to: responsive to the converting the pixels of the first image data into the mathematical array, compress a size of the mathematical array.

In another variation of this embodiment, the computer-readable media further stores machine readable instructions that, when executed, cause the microprocessor to: determine, using the embedding of the first image data, whether the first object is covered.

In yet another variation of this embodiment, the first object is covered, the first image data is a first set of first image data, and the embedding of the first image data is a first embedding of the first image data, and the computer-readable media further stores machine readable instructions that, when executed, cause the microprocessor to: indicate, to a user, to scan the first object again; retrieve a second set of first image data of the detected object from the memory; and generate, using the second set of first image data, a second embedding of the second set of first image data; wherein the comparing the embedding of the first image data is comparing the second embedding of the second set of first image data.

In still yet another variation of this embodiment, a neural network converts the pixels of the first image data into the mathematical array, and the computer-readable media further stores machine readable instructions that, when executed, cause the microprocessor to: train, using a labelled dataset, the neural network to generate the embedding of the first image data.

In another variation of this embodiment, the labelled dataset includes a plurality of sets of training image data, and training the neural network includes: receiving designations between a subset of the plurality of sets of training image data based on similarity; and determining a distance for each node of the neural network from a seed node based on the designations.

In yet another variation of this embodiment, the comparing the embedding of the first image data to each support sample of the one or more support samples includes: calculating a difference between the embedding of the first image data and each support sample of the one or more support samples; and determining whether the difference between the embedding of the first image data and any of the each support sample of the one or more support samples is below a predetermined threshold.

In still yet another variation of this embodiment, a neural network compares the embedding of the first image data to each support sample of the one or more support samples, and the calculating the difference includes: calculating a distance between a seed node representing the embedding of the first image data and each node representing each support sample of the one or more support samples.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
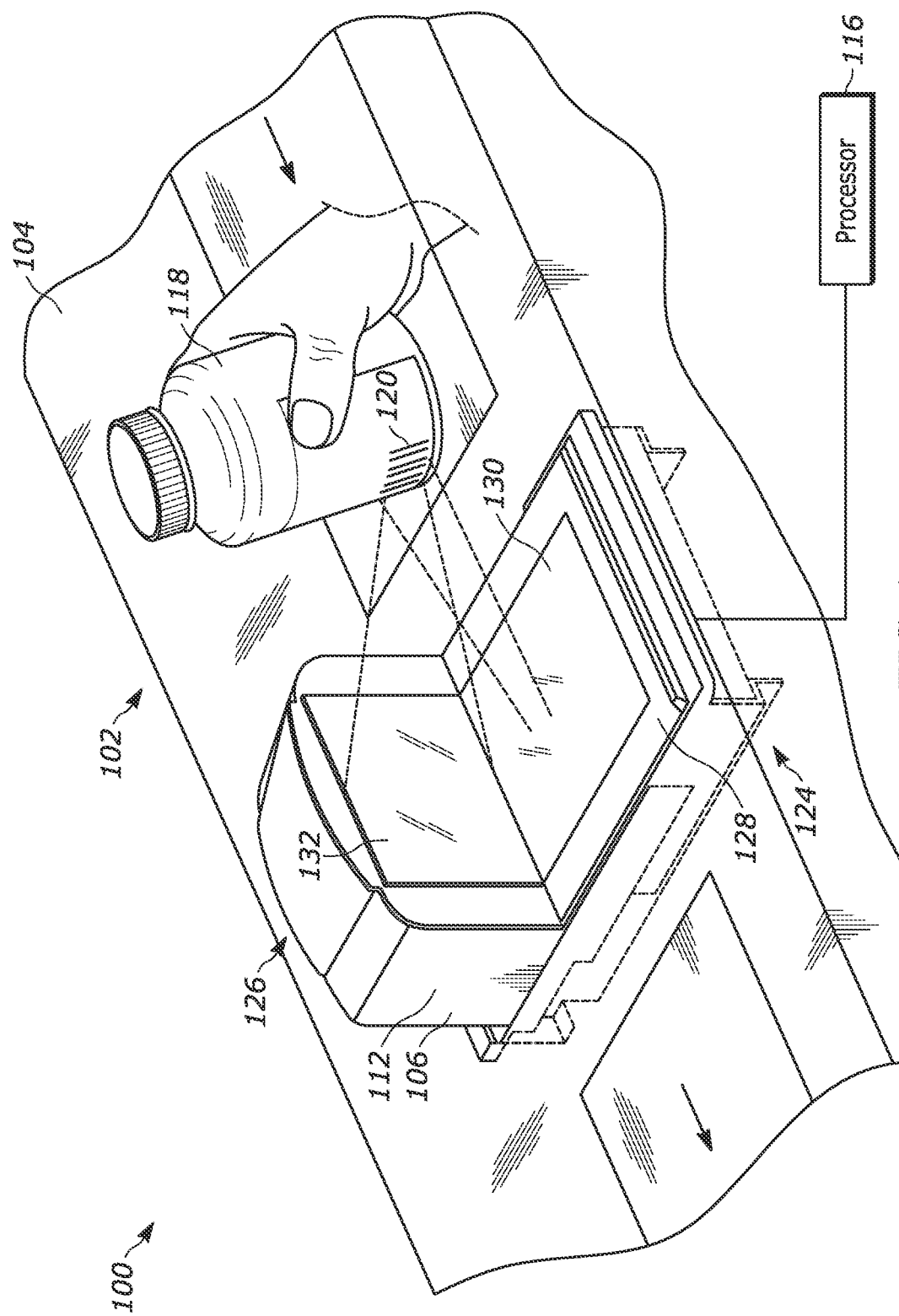
FIG. 1 illustrates an isometric view of barcode reading platform performing a method for rescan detection in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In creating a compact system for a self-checkout scanning device, a secure system is generally desirable. As such, it is further desirable for the scanning device to detect attempts by a potential bad-faith actor to trick the device and leave the retail location without proper payment for an item. For example, a potential bad-faith actor may move a product in front of a camera for the scanner while scanning a separate, cheaper item or may bag the product and separately scan a separate product afterward as a fake rescan. However, storing image data in the necessary quantity requires vast quantities of memory and is difficult for computers to perform accurately. As such, it is further desirable for the scanning device to create and compare embeddings as mathematical arrays based on the image data. The current disclosure describes a method and imaging system that improves upon current technologies by: (i) providing a secure method for self-checkout scanning; (ii) accurately determining whether an event taking place after a failed scan is a rescan event or a new scan event using embedding data from image data; and (iii) reducing the size and cost of a secure self-checkout device.

In an exemplary implementation, the present application provides a method for operating an indicia reader and determining whether a scan event after a failed scan event is a rescan event. The method includes detecting, by the controller, an object in the scanning region; responsive to the detecting, determining that a successful decode of an indicia associated with the detected object has not occurred; responsive to the determining, retrieving image data of the detected object from the controller; generating, using the image data, an embedding of the image data; detecting, by the controller, a second object in the scanning region; retrieving one or more support samples from an image database, wherein each support sample is an embedding of image data of an object class based on the second object; comparing the embedding of the image data to each support sample of the one or more support samples; and responsive to determining, based on the comparison, that the embedding of the image data does not match any support sample, performing at least one of: (i) generating an alert, (ii) preventing a transaction from being finalized, (iii) preventing a subsequent scan event, or (iv) logging the determination.

The methods and systems of the current disclosure provide a number of improvements over a traditional self-checkout device. A traditional self-checkout device utilizes a scale incorporated into the overall device that measures the weight of an object being scanned to determine if a potential bad-faith actor is attempting to take an item without proper payment. However, the addition of a scale adds unneeded bulk to the self-checkout device, leading to a reduction in the number of devices that can be used by a retail location at once and increasing the cost of each individual device. Moreover, the scale has limitations with regards to items with variable or irregular weights. As such, it will be appreciated that the methods and systems of the present disclosure allow for greater reduction in size while maintaining efficiency and providing a secure method of self-checkout for customers.

Referring to the figures, FIG. 1 illustrates a perspective view of an example scanning system 100 (e.g., an indicia reader) in accordance with the teachings of this disclosure. In the exemplary embodiment, the system 100 includes a workstation 102 with a counter 104 and a bi-optical (also referred to as "bi-optic") barcode reader 106. The barcode reader 106 may also be referred to as a bi-optic scanner or an indicia reader. In some implementations, the bi-optic barcode reader 106 may include an IR sensor in addition to a number of cameras, such as an RGB camera for imaging and a barcode camera for black and white imaging at a high framerate. In some implementations, the RGB camera provides higher resolution and color images at a slower framerate than the black and white barcode camera, which may have a resolution of approximately 1000 pixels across. The IR sensor may detect movement of an object across a scanning region for either or both cameras. The scanning system 100 may be managed by a store employee such as a clerk. In other cases, the scanning system 100 may be part of a self-checkout lane wherein customers are responsible for checking out their own products.

The barcode reader 106 includes a housing 112 comprised of a lower housing 124 and a raised housing 126. The lower housing 124 may be referred to as a first housing portion and the raised housing 126 may be referred to as a tower or a second housing portion. The lower housing 124 includes a top portion 128 and houses an imaging assembly 130. In some embodiments, the top portion 128 may include a removable or a non-removable platter (e.g., a weighing platter). The top portion 128 can be viewed as being positioned substantially parallel with the counter 104 surface. In some implementations, the phrase "substantially parallel" refers to within 10 degrees of parallel. In further implementations, the phrase "substantially parallel" means the top portion 128 accounts for manufacturing tolerances. While the counter 104 and the top portion 128 are illustrated as being approximately co-planar in FIG. 1, in other embodiments, the counter 104 may be raised or lowered relative to the top surface of the top portion 128, where the top portion 128 is still viewed as being positioned substantially parallel with the counter 104 surface.

The raised housing 126 is configured to extend above the top portion 128 and includes an imaging assembly 132. The raised housing 126 is positioned in a generally upright plane relative to the top portion 128. Note that references to "upright" include, but are not limited to, vertical. Thus, in some implementations, something that is upright may deviate from a vertical axis/plane by as much as 45 degrees.

Imaging assemblies 130 and 132 include optical assemblies of optical elements such as lenses, apertures, etc., and at least one image sensor. Imaging assemblies 130 and 132 are further communicatively coupled to a processor 116. The image sensors may include one or more color cameras, one or more monochrome imagers, and/or one or more optical character readers. The processor 116 may be disposed within the barcode reader 106 or may be in another location. The imaging assemblies 130 and 132 are operable to capture one or more images of targets (e.g., object 118) within their respective fields of view (FOV). In the exemplary embodiment of FIG. 1, imaging assemblies 130 and 132 are included in the same barcode reader 106. In other embodiments, the imaging assemblies 130 and 132 are included in different barcode readers.

The object 118 may be swiped past the barcode reader 106. In doing so, a product code (e.g., an indicia 120) associated with the object 118 is positioned within the FOV of the imaging assemblies 130 and/or 132. The indicia 120 may be a bar code, a radio-frequency identification (RFID) tag, a quick response (QR) code, and/or any other product-identifying code.

Figure 2:
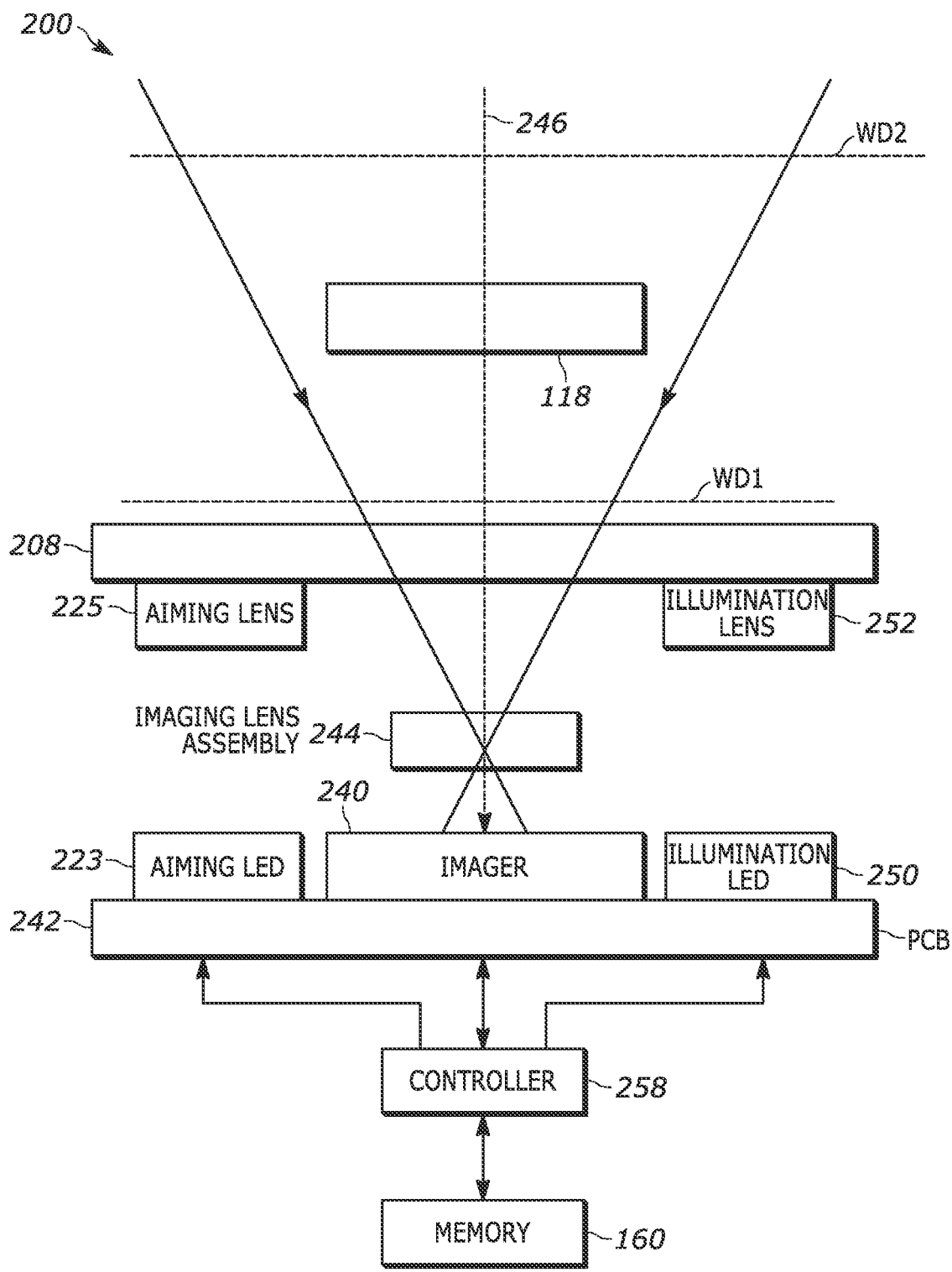
FIG. 2 illustrates a schematic block diagram of various components of the barcode reading platform of FIG. 1 in accordance with some embodiments.

Referring to FIG. 2, an imaging reader including and/or operating as imaging assembly 130 includes a light-detecting sensor or imager 240 operatively coupled to, or mounted on, a printed circuit board (PCB) 242 in the lower portion 124 or the housing 112, depending on the implementation. Top portion 128 including imaging assembly 132 may have a substantially similar configuration. In an embodiment, the imager 240 is a solid state device, for example a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging lens assembly 244 over a FOV along an imaging axis 246 through the window 208. The return light is scattered and/or reflected from a target (e.g., object 118) over the FOV. The imaging lens assembly 244 is operative for focusing the return light onto the array of image sensors to enable the object 118, and more particularly indicia 120, to be read. In particular, the light that impinges on the pixels is sensed and the output of those pixels produce image data that is associated with the environment that appears within the FOV (which can include the object 118). This image data is typically processed by a controller 258 (usually by being sent to a decoder or a decoder module) which identifies and decodes decodable indicial captured in the image data. Once the decode is performed successfully, the reader can signal a successful "read" of the object 118 or an indicia 120 of the object 118 (e.g., a barcode). The object 118 may be located anywhere in a working range of distances between a close-in working distance (WD1) and a far-out working distance (WD2). In an implementation, WD1 is about one-half inch from the window 208, and WD2 is about thirty inches from the window 208.

An illuminating light assembly is also mounted in the barcode reader 106 in connection with imaging assemblies 130 and/or 132 and within lower portion 124, upper portion 128, or the housing 112, depending on the implementation. The illuminating light assembly includes an illumination light source, such as at least one light emitting diode (LED) 250 and at least one illumination lens 252. In some implementations, the illuminating light assembly includes multiple LEDs 250 and/or illumination lenses 252. The illumination light source is configured to generate a substantially uniform distributed illumination pattern of illumination light on and along the object 118 to be read by image capture. At least part of the scattered and/or reflected return light is derived from the illumination pattern of light on and along the object 118.

An aiming light assembly may also be mounted in the imaging reader 200 and preferably includes an aiming light source 223, e.g., one or more aiming LEDs or laser light sources, and an aiming lens 225 for generating and directing a visible aiming light beam away from the reader 200 onto the object 118 in the direction of the FOV of the imager 240.

As also shown in FIG. 2, the imager 240, the illumination LED 250, and/or the aiming source 223 are operatively connected to a controller or programmed microprocessor, for example, controller 258, operative for controlling the operation of these components. A memory 160 is coupled and accessible to the controller 258. In some implementations, the controller 258 is the same as the one used for processing the captured return light from the illuminated object 118 to obtain data related to the object 118. Controller 258 may additionally be configured to control imaging assembles 130 and/or 132 and associated illumination LED. In alternate implementations, imaging assembly 130 and imaging assembly 132 may be controlled by different controllers. The controller 258 may send information (i.e., one or more images and/or image data) to a processor (e.g., processor 116) for further processing. Alternatively, controller 258 may include processor 116.

Moreover, in various embodiments, controller 258 and/or processor 116 may perform the techniques as described herein using a neural network. The neural network may be trained using a supervised machine learning program or algorithm. The neural network may be a convolutional neural network, a deep learning neural network, or a combined learning module or program that learns in two or more features or feature datasets (e.g., pixel data) in a particular areas of interest. In some implementations, the neural network is implemented using a You Only Look Once (YOLO) architecture. In other implementations, the neural network is implemented using an Efficient Net architecture. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some embodiments, the machine learning based algorithms may be included as a library or package executed on a computing platform (e.g., user computing device 102). For example, libraries may include the TENSORFLOW based library, the PYTORCH library, and/or the SCIKIT-LEARN Python library.

Machine learning may involve identifying and recognizing patterns in existing data (such as training a neural network based on pixel data of image data including one or more target objects with barcodes) in order to facilitate making predictions or identification for subsequent data (such as using the neural network on new pixel data of a new target object in order to determine where the new target object is located in an image).

Machine learning model(s) implemented on the neural network(s), such as the localizer module, the embedding module, and the verification module described herein for some embodiments, may be created and trained based upon example data (e.g., "training data" and related pixel data) inputs or data (which may be termed "features" and "labels") in order to make valid and reliable predictions for new inputs, such as testing level or production level data or inputs. In supervised machine learning, a machine learning program operating as a neural network on a server, computing device, or otherwise processor(s), may be provided with example inputs (e.g., "features") and their associated, or observed, outputs (e.g., "labels") in order for the machine learning program or algorithm in the neural network to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the neural network, executing on the server, computing device, or otherwise processor(s), to predict, based on the discovered rules, relationships, or model, an expected output. The particulars of training the machine learning models implemented on the neural networks are described in more detail below with regard to FIG. 3.

Though not shown, additional optical elements, such as collimators, lenses, apertures, compartment walls, etc. are provided in the housing 112. Further, while the imaging assemblies 130 and 132 are shown in FIG. 1 as perpendicular, the imaging assemblies may be coplanar or in any other arrangement with overlapping FOV. Moreover, while FIG. 2 shows the imager 240, the illumination source 250, and the aiming source 223 as being mounted on the same PCB 242, it should be understood that different embodiments of the barcode reader 200 may have these components each on a separate PCB, or in different combinations on separate PCBs. For example, in an embodiment of the barcode reader 200, the illumination LED source is provided as an off-axis illumination (i.e., has a central illumination axis that is not parallel to the central FOV axis).

It will be understood that, although the above-identified embodiments describe a particular barcode reader 106 in a scanning system 100, this disclosure is applicable to a variety of bi-optic barcode readers, including, but not limited to, gun-type handheld readers, mobile computer-type readers, presentation readers, etc. Further, it will be understood that the barcode reader 106 may implement similar techniques as those described herein using a removable imaging engine device containing some or all of the components described in FIG. 2 above.

Figure 3:
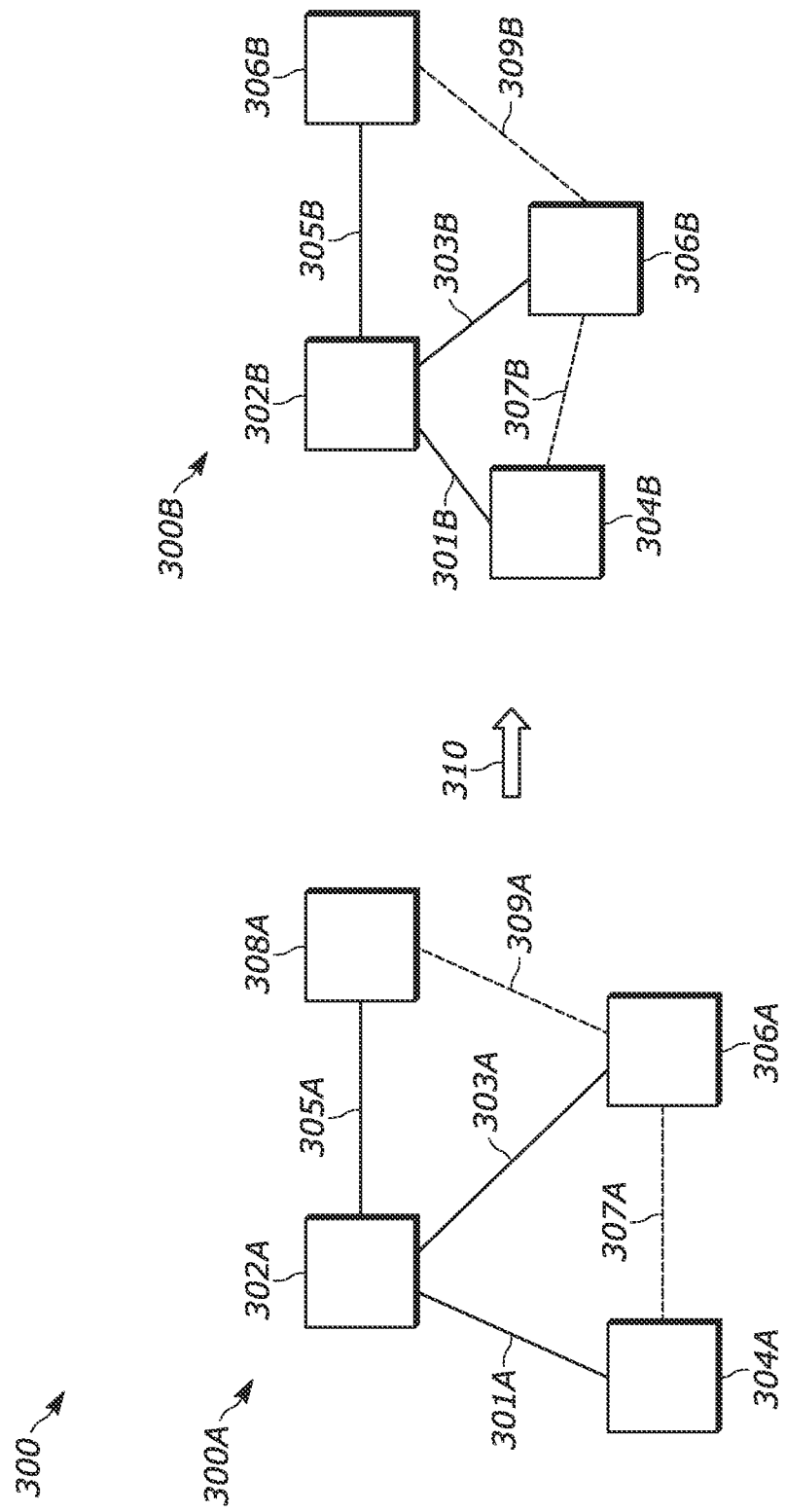
FIG. 3 illustrates a schematic block diagram of a subset of a neural network implemented in the barcode reading platform of FIG. 1 and performing a method for rescan detection in accordance with some embodiments.

Referring next to FIG. 3, a schematic block diagram illustrates a subset of a neural network implemented in the barcode reading platform 106 of FIG. 1. In particular, FIG. 3 depicts a subset of a neural network 300A before training and a neural network 300B after training, generally referred to as the neural network (NN) 300. In some implementations, the NN 300 is a convolutional neural network (CNN). In other implementations, the NN 300 may utilize other known NN architectures and/or NN processing techniques. Depending on the implementation, a training module trains the NN 300. The training module can be a software module implemented on processor 116 and/or on a remote computing device. The training module can alternatively be a hardware module that is dedicated to training the NN 300. The trained NN 300B may be used to implement a number of techniques described herein. For example, the NN 300B may be used to identify the location of an object and/or hand in image data, to generate an embedding for image data, to verify image data contains a particular object, or any other such technique and/or combination of techniques as described herein.

Before training occurs, NN 300A includes at least a seed node 302A and a number of other nodes 304A, 306A, and 308A. The seed node 302A represents the item for which the training module trains the NN 300. For example, the NN 300 may be trained for each of five products, such as ketchup, mayonnaise, mustard, relish, and hot sauce. The processor 116 designates the seed node 302A as each product in turn. The NN 300A also includes a number of other nodes 304A, 306A, and 308A connected to the seed node 302A. In the example outlined above, the processor 116 receives a number of sets of image data for each of the five products. In the exemplary embodiment of FIG. 3, to train the NN 300A, the processor 116 or training module chooses at least three images from the received image data, at least two of which are for the product in question, and at least one of which is for another one of the four products. When training the NN 300A, each of the additional nodes 304A, 306A, and 308A represent one of the images being used to train the NN 300A. So, for example, the seed node 302A may be for ketchup, and nodes 304A and 306A may both be image data of ketchup while node 308A is image data of mayonnaise. Although FIG. 3 depicts three images, the number of images used at a time may be any suitable number. For example, the number may be N+1, where N is the number of products being compared and the additional image is to show corroboration of the correct image as described above.

Between each pair of nodes is an edge 301A, 303A, 305A, 307A, and 309A. For the sake of simplicity, only some edges are illustrated in FIG. 3. Each edge 301A, 303A, 305A, 307A, and 309A represents the strength of the connection (e.g., similarity) between the two nodes in question. For example, an edge between two nodes both representing ketchup may be small compared to an edge between a node representing ketchup and a node representing mayonnaise.

After the processor 116 and/or training module receives the image data and assigns representative nodes, the processor 116 and/or training module modifies the nuclear distance (e.g., edge length) between the nodes for each of 301A, 303A, and 305A. In some implementations, the processor 116 also modifies the edge length for each of edges 307A and 309A, though neither connects to the seed node 302A. In some implementations, the processor 116 receives embedding information for each image as described with regard to FIG. 4 below before modifying 310 the NN 300A into NN 300B. In such implementations, the processor 116 modifies the positioning of the nodes 304A, 306A, and/or 308A relative to the seed node 302A to 304B, 306B, and/or 308B, such that the positioning reflects the difference between embedding mathematical arrays. In further implementations, a human element modifies and/or verifies the positioning of each node 304A/B, 306A/B, and/or 308A/B. In other implementations, the human element only labels data and/or nodes.

After training 310 the NN 300A, the processor 116 repeats the process for other products. In some implementations, the processor 116 trains 310 the NN 300A until each product amongst a list of products has been used. While the above example lists 5 products for simplicity, an implementation of this disclosure may compare more than 25,000 products. As such, some implementations may instead include a comparison of the trained NN 300B to a validation dataset to determine how well the trained NN 300B is performing. When performance reaches a particular metric (for example, a pre-determined percentage of success), the processor may stop training the NN 300. In further implementations, once the validation dataset performance confirms that the NN 300 is trained NN, the trained NN 300B has received enough product data that the NN 300 no longer needs to be retrained if new products are introduced, leading to a robust neural network capable of performing the instant techniques without further updating required.

In further implementations, the processor 116 organizes the NN 300B during the training/modification process 310 according to cosine similarity (i.e., the angle between edges) rather than nuclear distance as described above. In such implementations, the processor 116 may adjust positioning of the nodes 304A, 306A, and/or 308A to the positions of the nodes 304B, 306B, and/or 308B reflecting the embedding mathematical arrays as described above. Similarly, a human element may verify and/or adjust positioning for the nodes 304A/B, 306A/B, and/or 308A/B relative to the seed node 302A/B.

In some implementations, the processor 116 may additionally or alternatively train the NN 300A to create, calculate, and/or predict bounding boxes in the image data. In some such implementations, the processor 116 trains the NN 300A using datasets labelled by a human element, where the labels for the datasets are bounding box locations in an (x, y) plane for the product. In further implementations, the labels for the datasets may also include bounding box locations in an (x, y) plane for a hand located in the image. In some such implementations, the edges 301A, 303A, 305A, 307A, and/or 309A are representative of overlap between the bounding boxes.

After the processor 116 trains the NN 300A into a trained NN 300B, the processor 116 may use the trained NN 300B to perform a number of techniques described herein. In some implementations, the trained NN 300B may calculate and/or predict the location of bounding boxes for the object 118 and/or a hand in image data of the object 118, generate an embedding for image data of the object 118, determine whether a wrapping and/or plastic bag covers the object 118 in image data of the object 118, and or verify whether the image matches embeddings for support samples as described in more detail below.

Figure 4:
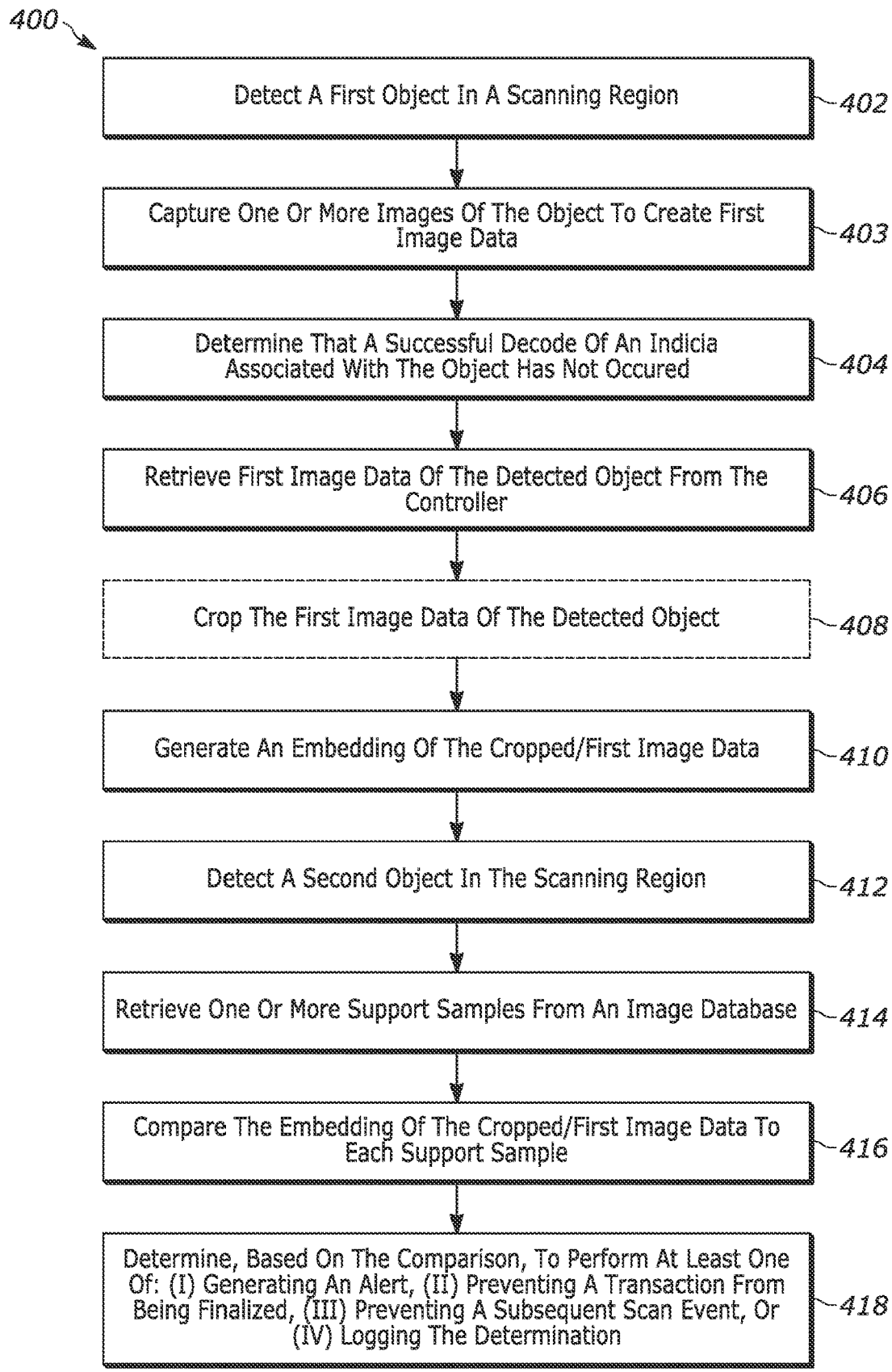
FIG. 4 illustrates a flow diagram of an example method for detecting rescan of a product at a barcode reading platform of FIG. 1 in accordance with some embodiments.

Referring next to FIG. 4, a flowchart illustrates a method 400 for operating an indicia reader. Generally, the method 400 includes operating an indicia reader to detect—such as via the IR sensor—that an object is in front of the bi-optic cameras (including imaging assemblies) but a barcode and/or product code has not been decoded. The system bi-optic cameras then take pictures of the object and pause the processing to wait for another decode event to determine whether the next decode event is a rescan or a new decode event. For the sake of clarity, FIG. 4 is discussed with regard to controller 258, imaging assembly 132, object 118, and scanning system 100. However, any similarly suitable elements may be used to implement the techniques of method 400.

At block 402, a processor 116 detects, by a controller 258 and an imaging assembly 132 having a field of view (FOV) and a scanning region, that an object 118 enters the scanning region. In some implementations, the imaging assembly 132 is part of a camera sensor, such as an RGB camera. In further implementations, the imaging assembly 132 is part of a general color imaging device. In such implementations, the imaging assembly 132 has a lower frequency (for example, 30 fps) of images captured with a higher resolution (for example, 1MP, 2MP, 4MP, etc.). Depending on the implementation, the controller 258 may detect the presence of the object 118 when the object 118 enters the FOV or the scanning region of the imaging assembly 132, or the controller 258 may detect the presence of the object 118 when the object 118 leaves the FOV or scanning region. Similarly, the imaging assembly 132 may detect the presence of the object 118 while the object is in the FOV or scanning region, or some predetermined period of time after the object 118 leaves the FOV or scanning region. In some implementations, the processor 116 and/or controller 258 detects the object after the imaging assembly 132 takes an image or series of images of the object 118. In some such implementations, the image data is created from the image or series of images and may include a stream of image data, individual images, frames of images, series of images, partial images, partial image data, or any other similar type of image data. In further implementations, the processor 116 and/or controller 258 detects the object due to an infrared (IR) detection via a component of the scanning system 100 when the object 118 enters the scanning region, or through a similar detection event.

At block 403, the processor 116 and/or controller causes the imaging assembly 132 to capture one or more images of the object and the processor 116 and/or controller creates image data. Depending on the implementation, the image data may be an image, a series of images, a stream of image data, a portion of an image, a subset of image data corresponding with one or more images, or any similar type of image data.

At block 404, the processor 116 and/or controller 258 determines that a successful decode of an indicia associated with the detected object 118 has not occurred and/or the decode fails. In some implementations, the decode of an indicia associated with the detected object 118 fails when a barcode scanner 106, a processor 116, and/or a controller 258 communicatively coupled to the barcode scanner 106 fails to decode an indicia 120 on the object 118. Depending on the implementation, the indicia 120 may be and/or include a barcode, a QR code, an RFID tag, or any other similarly suitable product identifier and/or code. In some implementations, the processor 116 and/or controller 258 fails to decode the indicia 120 when the processor 116 and/or controller 258 does not retrieve and/or extract an identifying number from the indicia 120, such as a universal product code (UPC) number. The processor 116 and/or controller 258 may determine that the barcode scanner 106 fails to decode the indicia 120 after a time-out failure occurs. The processor 116 and/or controller 258 determines that a time-out failure occurs when, after receiving the indication that the object 118 is detected, the processor 116 and/or controller 258 receives an indication that a predetermined period of time has passed without the barcode scanner 106 decoding the indicia 120. In further implementations, the processor 116 and/or controller 258 determines that the barcode scanner 106 fails to decode the indicia 120 after a scan failure occurs. The processor 116 and/or controller 258 determines that a scan failure occurs when, after receiving the indication that the object 118 is detected, the processor 116 and/or controller 258 receives an indication that the detected object 118 is no longer detected without having decoded an indicia 120 of the detected object 118. In other implementations, the processor 116 and/or controller 258 receives an indication that the detected object 118 is no longer detected and determines that the indicia 120 was not decoded. After determining that the scan event has failed, the processor 116 and/or controller 258 may cause the barcode scanner 106 to display an indication to the user that the object should be rescanned.

At block 406, the processor 116 and/or controller 258 retrieves image data of the detected object 118. In some implementations, the controller retrieves images or image data from the imaging assembly 132. In implementations in which the controller detects the presence of the object 118 in block 402 due to an image or series of images, the processor 116 and/or controller 258 may query the imaging assembly 132 for and/or pull any further image data related to the image of the object 118.

In some implementations, flow continues to block 408, where the processor 116 and/or controller 258 crops the image data of the detected object 118. Depending on the implementation, the processor 116 and/or controller 258 may apply a product localizing module to generate a bounding box around the object 118 before cropping the image data. In such implementations, the processor 116 and/or controller 258 crops the image data in accordance with the generated bounding box (i.e., such that the bounding box forms the edges of the cropped image data). Additionally or alternatively, the processor 116 and/or controller 258 may generate a second bounding box around a hand in the image data and crop the image data such that both bounding boxes are included in the cropped image data. The processor 116 and/or controller 258 may use a trained neural network (NN) 300B such as a convolutional neural network (CNN), as described with reference to FIG. 3 above. In some implementations, the processor 116 and/or controller 258 may perform an analysis on the bounding boxes in accordance with FIG. 5 below. In further implementations, the processor 116 and/or controller 258 determines that multiple objects 118 are present in the image data and can crop the largest object, both objects, the first object that appears, the last object that appears, or by any other similar process. Alternatively, the processor 116 and/or controller 258 may cause a display of the barcode reader 106 to display a warning to the user that multiple objects are detected.

At block 410, the processor 116 and/or controller 258 generates an embedding of the image data. In implementations in which the processor 116 and/or controller 258 crops the image data, the processor 116 and/or controller 258 generates an embedding of the cropped image data. To generate the embedding of the cropped image data, the processor 116 and/or controller 258 converts pixels of the cropped image data into a mathematical array of floating point numbers, where each entry of the mathematical array corresponds to visual details of one or more of the pixels. Depending on the implementation, the visual details may include the color of the pixel(s), contrast between shades of the pixel(s), optical characteristics of the pixel(s), and/or other visual characteristics that may be used in identifying an object. In some implementations, the processor 116 and/or controller 258 creates the mathematical array using the trained NN 300B, such as a CNN. In further implementations, the processor 116 and/or controller 258 or a separate training module trains the NN 300B using labelled datasets as described in accordance with FIG. 3 above. In such implementations, the mathematical array of the embedding may reflect or otherwise describe the object 118 being scanned, and a difference between the mathematical array of the cropped image data of the object 118 and stored embedding(s) may reflect a distance between the object being scanned and one or more support samples corresponding to the stored embedding(s). In some implementations, the processor 116 and/or controller 258 and/or the NN 300B compresses the mathematical array as part of the embedding process. For example, the size of the mathematical array may compress from a size of 300×300 entries to a size of 128×128 entries. In implementations in which multiple objects 118 are present in the image data, the processor 116 and/or controller 258 generate the embeddings separately for each object and use each in the techniques disclosed herein or may generate the embedding for the entire image data set.

In some implementations, the processor 116 and/or controller 258 determines that object 118 is covered and/or wrapped, for example in a plastic bag. Depending on the implementation, the processor 116 and/or controller 258 may make such a determination before, after, or while performing the embedding process. When the processor 116 and/or controller 258 makes the determination after performing the embedding process, the processor 116 and/or controller 258 may make the determination based on the mathematical array of the embedding. For example, the processor 116 and/or controller 258 can determine that some subset of the mathematical array is consistent with such an array for a plastic bag, based on the visual parameters of the bag. When the processor 116 and/or controller 258 makes the determination before or while performing the embedding process, the processor 116 and/or controller 258 may make the determination based on the image data.

At block 412, the processor 116 and/or controller 258 detects a second object. In some implementations, the processor 116 and/or controller 258 detects the second object after generating the embedding at block 410. In further implementations, the processor 116 and/or controller 258 detects the second object after detecting the first object 118, but before performing any of blocks 404-410. Similarly, the processor 116 and/or controller 258 may detect the second object at any point in between. In some implementations, the detection of the second object is also a non-scan event. In some such implementations, the processor 116 and/or controller 258 performs blocks 406, 408, and 410 for the second object and waits for an additional scan event.

At block 414, the processor 116 and/or controller 258 retrieves one or more support samples from an image database. In some implementations, the processor 116 and/or controller 258 first decodes the indicia on the second object. The processor 116 and/or controller 258 then identifies the object using the decoded indicia. In some such implementations, by identifying the object, the processor 116 and/or controller 258 determines a UPC number with which the processor 116 and/or controller 258 queries the image database and receives the one or more support samples. The support samples may be embeddings for image data taken by the imaging assembly 132 or may be taken by any similar such imaging assembly. Similarly, the support samples may be embeddings of cropped image data as described above or may be the entire image data set, depending on the implementation. Depending on the implementation, the processor 116 and/or controller 258 may retrieve a single support sample or multiple support samples. In implementations in which the processor 116 and/or controller 258 retrieves multiple support samples, the support samples may be and/or include embeddings for image data and/or images of a product from multiple angles. Similarly, the embeddings of the support samples may be updated over time as the most representative image data. The embeddings of the support samples can also include visual information for the product code on the product.

At block 416, the processor 116 and/or controller 258 compares the embedding of the image data of the object 118 to each support sample. The processor 116 and/or controller 258 may compare the embedding of the image data and the support samples by calculating a difference between the embedding of the image data and each support sample. In some implementations, the processor 116 and/or controller 258 calculates a difference between each entry of the mathematical arrays for the embeddings. In some implementations, the processor 116 and/or controller 258 determines whether the calculated difference between the embedding of the image data and any support sample of the one or more support samples is below a predetermined threshold. If the difference is below the predetermined threshold, then the processor 116 and/or controller 258 determines that the first object 118 matches the second object. In some implementations, the processor 116 and/or controller 258 stops the determination as soon as the calculated difference is determined to be less than the predetermined threshold (i.e., the processor 116 and/or controller 258 stops comparing the embedding of the image to the support samples). In further implementations, the processor 116 and/or controller 258 continues to compare the embedding of the image data to the support samples even after determining that one of the calculated differences is less than the predetermined threshold. In some such implementations, the processor 116 and/or controller 258 uses an average calculated difference to determine whether the object 118 matches the support samples. In other such implementations, the processor 116 and/or controller 258 may determine whether the object 118 matches the support samples if at least one calculated difference falls below the predetermined threshold, or when a predetermined number of calculated differences fall below the predetermined threshold.

At block 418, the processor 116 and/or controller 258 determines, based on the comparison, to perform at least one of: (i) generating an alert, (ii) preventing a transaction from being finalized, (iii) preventing a subsequent scan event, or (iv) logging the determination of the object mismatch. In some implementations, generating the alert is generating an alert to a management personnel. In other implementations, the alert is generated for a user to instruct the user to rescan the item. In further implementations, preventing the transaction from being finalized includes preventing the scanning system 100 from registering the item as a valid scan event and does not add the item to a user's total scanned list. In some implementations, the system prevents a subsequent scan event. Depending on the implementation, the scanning system 100 may prevent the subsequent scan event until personnel arrives to manually override the block or until the user performs a rescan. In still further implementations, the system may log the determination and, upon reaching a predetermined threshold or thresholds, may institute one or more of the other options.

In some implementations, the determination may indicate whether the scan event is a rescan event. The processor 116 and/or controller 258 determines to perform one of the actions outlined above (e.g., determines that the scan event is a rescan event) when the processor 116 and/or controller 258 determines that the first object 118 matches the support samples. In some implementations, a trained NN 300B such as a CNN verifies that the difference between the embeddings falls below the predetermined threshold (and, as such, that the object 118 matches the support samples). In some such implementations, the trained NN 300B takes the embeddings as an input and determines whether the object 118 matches the support samples based on the nuclear distance of the support samples from a seed node representative of the embedding for the image of the object 118 and/or a cosine similarity of edges between nodes in the NN 300B. For example, should the nuclear distance of the support samples exceed a predetermined threshold, the processor 116 and/or controller 258 and/or trained NN 300B outputs an indication that the product is different and a rescan did not occur. In further implementations, the trained NN 300B may compare multiple thresholds to give a likelihood of a rescan event as the output and perform an action as detailed below based on the likelihood. In further implementations, the trained NN 300B is the same trained NN 300B that generates the embeddings at block 410.

In implementations in which the processor 116 and/or controller 258 determines that the first object 118 does not match the support sample and generates an alert, the processor can generate a noise or other notification to the user to indicate that the item was not scanned properly. In some implementations in which the processor 116 and/or controller determines to log the failed event as an object mismatch, the processor 116 and/or controller 258 keeps track of the number of occurrences of failed scan events during a single session and can alert a supervisor or employee should the number surpass a predetermined threshold.

Figure 5:
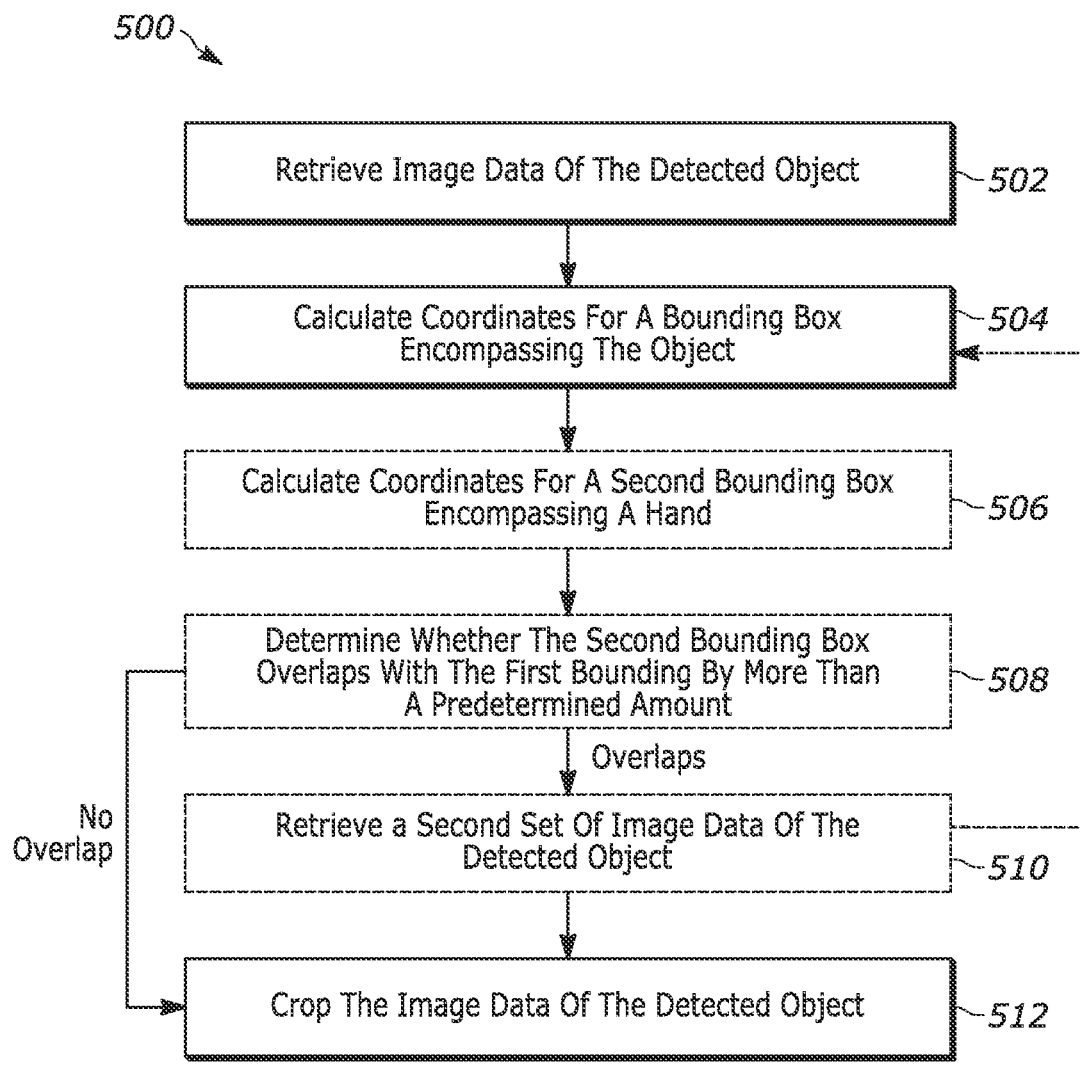
FIG. 5 illustrates a flow diagram of an example method for calculating bounding boxes for image data in the method of FIG. 4 at a barcode reading platform of FIG. 1 in accordance with some embodiments.

Referring next to FIG. 5, a flowchart illustrates a method 500 for calculating bounding boxes and cropping image data retrieved in the method 400. For the sake of clarity, FIG. 5 is discussed with regard to processor 116 and/or controller 258, object 118, and scanning system 100. However, any similarly suitable elements may be used to implement the techniques of method 500.

At block 502, the processor 116 and/or controller 258 retrieves image data of a detected object 118, similar to block 406 as described with regard to FIG. 4 above. In some implementations, a processor 116 or the scanning system 100 retrieves the image data from the processor 116 and/or controller 258. After retrieving the image data of the detected object 118, the processor 116 and/or controller 258 calculates coordinates for a bounding box encompassing the object at block 504. In some implementations, the processor 116 and/or controller 258 calculates the bounding box using a neural network (NN), such as a convolutional neural network (CNN). In some such implementations, the CNN is trained using a dataset labelled by humans. The labels are the bounding box coordinates in an (x, y) plane for the image. The bounding box coordinates in such implementations define a perimeter for the bounding box encompassing an object. Depending on the implementation, the bounding box surrounds the object or partially encompasses the object. In some further implementations, the training is supervised by a CNN training module that verifies an output by the CNN to train the network. In some implementations, the flow of the method 500 continues to block 506. In other implementations, however, flow continues from block 504 directly to block 512 as described below.

At block 506, the processor 116 and/or controller 258 calculates coordinates for a second bounding box in the image data of the detected object 118. In particular, the processor 116 and/or controller 258 calculates a second bounding box encompassing a hand in the image data. Similarly to the first bounding box, the second bounding box may completely surround the hand or partially encompass the hand. In some implementations, the processor 116 and/or controller 258 calculates the second bounding box in response to determining that a hand is present in the image data. In further implementations, the processor 116 and/or controller 258 calculates the second bounding box in response to determining that the first bounding box has uncharacteristic dimensions (i.e. an irregular shape and/or a shape with more than four sides), contrasting visual parameters (i.e. color, lack of a label, etc.), a large area of blank space in the bounding box (i.e. the box must cover non-object space to fit the hand in), or other similar determinations. Depending on the implementation, the processor 116 and/or controller 258 may calculate the bounding box using a neural network, such as a convolutional neural network, similar to the bounding box described above in block 504. In some such implementations, the CNN is trained using a dataset labelled by humans. The labels are the bounding box coordinates in an (x, y) plane for the image data. The bounding box coordinates in such implementations define a perimeter for the bounding box encompass the hand. In some such implementations, the CNN determines the first and second bounding boxes substantially simultaneously or in close concert. Alternatively, the CNN determines one of the bounding boxes before determining the other. In some further implementations, the training is supervised by a CNN training module that verifies an output by the CNN to train the network.

At block 508, the processor 116 and/or controller 258 determines whether the second bounding box overlaps with the first bounding box. Any overlap between the first bounding box and the second bounding box represents an area in the image data in which the hand covers part of the object 118 or vice versa. In some implementations, the processor 116 and/or controller 258 determines whether overlap between the second bounding box and the first bounding box exceeds a predetermined threshold value. For example, the processor 116 and/or controller 258 determines that a first bounding box and a second bounding box overlap in the image data by more than 30%, 45%, 60%, or any other suitable amount. Depending on the determination the processor 116 and/or controller 258 makes, the flow of method 500 may continue to block 510 or may skip directly to block 512. In some implementations, the flow of method 500 continues to block 510 when the processor 116 and/or controller 258 determines that there is an overlap between the first bounding box and the second box and skips to block 512 when the processor 116 and/or controller 258 determines that there is no such overlap. In further implementations, the second bounding box is substantially encompassed by the first bounding box, indicating that the object 118 is held by a hand in the middle. In such implementations, the processor 116 and/or controller 258 still determines whether the overlap is greater than the predetermined threshold amount and follows suit appropriately.

At block 510, the controller 258 and/or processor 116 retrieves a second set of image data of the detected object 118. In some implementations, the processor 116 and/or controller 258 discards the first set of image data after determining that the hand covers too much of the object 118 and pulls a second set of image data from an already captured series of images. In some implementations, the processor 116 and/or controller 258 causes a display of the barcode reader 106 to display a message to the user, requesting another scan of the item. In some such implementations, the message further includes the problem (i.e., that the hand is covering the object). In still other implementations, the processor 116 and/or controller 258 may transmit a message to personnel to assist the user. After receiving the second set of image data, the processor 116 and/or controller 258 may repeat blocks 504-508 and recalculate new bounding boxes for the new image data.

At block 512, after the processor 116 and/or controller 258 determines that the second bounding box does not overlap with the first bounding box by more than a predetermined threshold amount, the processor 116 and/or controller 258 crops the image data of the detected object 118 as described with regard to FIG. 4 in block 408 above. In some implementations, the calculated bounding box or boxes are too small and the processor 116 and/or controller 258 cannot crop the image data. In some such implementations, the processor 116 and/or controller 258 discards the image data and retrieves a new set of image data, repeating blocks 502 through 512.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for operating an indicia reader, the indicia reader having a scanning region and a controller communicatively coupled to a memory, the method comprising:
   detecting, by the controller, a first object in the scanning region;
   capturing one or more images of the first object to create first image data associated with the first object, the first image data being stored in the memory;
   determining that a successful decode of an indicia associated with the first object has not occurred;
   responsive to the determining, retrieving the first image data associated with the first object from the memory;
   generating, using the first image data, an embedding of the first image data;
   detecting, by the controller, a second object in the scanning region;
   retrieving one or more support samples from an image database, wherein each support sample is an embedding of second image data associated with an object class based on the second object;
   comparing the embedding of the first image data to each support sample of the one or more support samples; and
   responsive to determining, based on the comparing, that the embedding of the first image data does not match any of the each support sample of the one or more support samples, performing at least one of: (i) generating an alert, (ii) preventing a transaction from being finalized, (iii) preventing a subsequent scan event, or (iv) logging a determination of an object mismatch.

2. The method of claim 1, wherein the determining that the successful decode of the indicia associated with the first object has not occurred includes:
   receiving, from the controller, an indication at least one of (i) that a predetermined period of time has passed, since detecting the first object, without the successful decode of the indicia, or (ii) that the first object is no longer detected in the scanning region and that the successful decode of the indicia has not occurred; and
   determining, based on the indication, that at least one of a time-out failure or a scan failure has occurred.

3. The method of claim 1, further comprising:
   responsive to receiving the first image data, cropping the first image data to obtain cropped image data;
   wherein the generating the embedding of the first image uses the cropped image data.

4. The method of claim 3, further comprising:
   calculating coordinates for a bounding box at least partially encompassing the first object in the first image data;
   wherein the cropping is based on calculating the coordinates and includes cropping the first image data based on the bounding box.

5. The method of claim 4, wherein a neural network calculates the coordinates for the bounding box, the method further comprising:
   training, using a labelled dataset, the neural network to calculate the coordinates of the bounding box.

6. The method of claim 3, further comprising:
   calculating coordinates for a first bounding box at least partially encompassing the first object in the first image data;
   identifying a hand in the first image data; and
   calculating coordinates for a second bounding box at least partially encompassing the hand in the first image data;
   wherein the cropping is based on the coordinates for the first bounding box and the coordinates for the second bounding box, and
   wherein the cropping includes cropping the first image data based on the first bounding box and the second bounding box.

7. The method of claim 6, further comprising:
   determining that the second bounding box does not overlap with more than a predetermined threshold proportion of the first bounding box.

8. The method of claim 6, wherein the retrieving the first image data includes retrieving a first set of first image data, the method further comprising:
   determining that the second bounding box overlaps with more than a predetermined threshold proportion of the first bounding box; and
   responsive to the determining that the second bounding box overlaps with more than the predetermined threshold proportion of the first bounding box, retrieving a second set of first image data of the first object;
   wherein the cropping the first image data is cropping the second set of first image data.

9. The method of claim 6, wherein the retrieving the first image data includes retrieving a first set of first image data, the method further comprising:
   determining that the second bounding box overlaps with more than a predetermined threshold proportion of the first bounding box;
   responsive to the determining that the second bounding box overlaps with more than the predetermined threshold proportion of the first bounding box, indicating, to a user, to scan the first object again; and
   retrieving a second set of first image data of the first object from the memory;
   wherein the cropping the first image data is cropping the second set of first image data.

10. The method of claim 6, wherein a neural network calculates the coordinates for the first bounding box and calculates the coordinates for the second bounding box, the method further comprising:
    training, using a first labelled dataset, the neural network to calculate the coordinates for the first bounding box; and
    training, using a second labelled dataset, the neural network to calculate the coordinates for the second bounding box.

11. The method of claim 1, further comprising:
    determining a successful decode of an indicia associated with the second object has occurred;
    wherein the retrieving the one or more support samples from the image database is based on a decoded barcode of the second object.

12. The method of claim 1, wherein the generating the embedding of the first image data includes:
    converting pixels of the first image data into a mathematical array;
    wherein each entry of the mathematical array corresponds to visual details of one or more pixels of the pixels.

13. The method of claim 12, further comprising:
    responsive to the converting the pixels of the first image data into the mathematical array, compressing a size of the mathematical array.

14. The method of claim 12, wherein a neural network converts the pixels of the first image data into the mathematical array, further comprising:

training, using a labelled dataset, the neural network to generate the embedding of the first image data.

15. The method of claim 14, wherein the labelled dataset includes a plurality of sets of training image data, and wherein the training the neural network includes:
receiving designations between a subset of the plurality of sets of training image data based on similarity; and
determining a distance for each node of the neural network from a seed node based on the designations.

16. The method of claim 1, further comprising:
determining, using the embedding of the first image data, whether the first object is covered.

17. The method of claim 16, wherein the first object is covered, the first image data is a first set of first image data, and the embedding of the first image data is a first embedding of the first image data, further comprising:
indicating, to a user, to scan the first object again;
retrieving a second set of first image data from the memory; and
generating, using the second set of first image data, a second embedding of the second set of first image data;
wherein the comparing the embedding of the first image data is comparing the second embedding of the second set of first image data.

18. The method of claim 1, wherein the comparing the embedding of the first image data to each support sample of the one or more support samples includes:
calculating a difference between the embedding of the first image data and each support sample of the one or more support samples; and
determining whether the difference between the embedding of the first image data and any of the each support sample of the one or more support samples is below a predetermined threshold.

19. The method of claim 18, wherein a neural network compares the embedding of the first image data to each support sample of the one or more support samples, and further wherein the calculating the difference includes:
calculating a distance between a seed node representing the embedding of the first image data and each node representing each support sample of the one or more support samples.

20. An imaging system for operating an indicia reader, the imaging system comprising:
the indicia reader, wherein the indicia reader has a scanning region and a controller communicatively coupled to a memory; and
a microprocessor and computer-readable media storing machine readable instructions that, when executed, cause the microprocessor to:
detect, by the controller, a first object in the scanning region;
capture one or more images of the first object to create first image data associated with the first object, the first image data being stored in the memory;
determine that a successful decode of an indicia associated with the first object has not occurred;
responsive to the determining, retrieve the first image data associated with the first object from the memory;
generate, using the first image data, an embedding of the first image data;
detect by the controller, a second object in the scanning region;
retrieve one or more support samples from an image database, wherein each support sample is an embedding of second image data associated with an object class based on the second object;
compare the embedding of the first image data to each support sample of the one or more support samples; and
responsive to determining, based on the comparing, that the embedding of the first image data does not match any of the each support sample of the one or more support samples, perform at least one of: (i) generating an alert, (ii) preventing a transaction from being finalized, (iii) preventing a subsequent scan event, or (iv) logging a determination of an object mismatch.

21. The imaging system of claim 20, wherein the determining that the successful decode of the indicia associated with the first object has not occurred includes:
receiving, from the controller, an indication at least one of (i) that a predetermined period of time has passed, since detecting the first object, without the successful decode of the indicia, or (ii) that the first object is no longer detected in the scanning region and that the successful decode of the indicia has not occurred; and
determining, based on the indication, that at least one of a time-out failure or a scan failure has occurred.

22. The imaging system of claim 20, wherein the computer-readable media further stores machine readable instructions that, when executed, cause the microprocessor to:
responsive to receiving the first image data, crop the first image data to obtain cropped image data;
wherein the generating the embedding of the first image data uses the cropped image data.

23. The imaging system of claim 22, wherein the computer-readable media further stores machine readable instructions that, when executed, cause the microprocessor to:
calculate coordinates for a first bounding box at least partially encompassing the first object in the first image data;
identify a hand in the first image data; and
calculate coordinates for a second bounding box at least partially encompassing the hand in the first image data;
wherein the cropping is based on the coordinates for the first bounding box and the coordinates for the second bounding box, and
wherein the cropping includes cropping the first image data based on the first bounding box and the second bounding box.

24. The imaging system of claim 23, wherein the computer-readable media further stores machine readable instructions that, when executed, cause the microprocessor to:
determine that the second bounding box does not overlap with more than a predetermined threshold proportion of the first bounding box.

25. The imaging system of claim 23, wherein the retrieving the first image data includes retrieving a first set of first image data and wherein the computer-readable media further stores machine readable instructions that, when executed, cause the microprocessor to:
determine that the second bounding box overlaps with more than a predetermined threshold proportion of the first bounding box; and
responsive to the determining that the second bounding box overlaps with more than the predetermined threshold proportion of the first bounding box, retrieve a second set of first image data of the first object;

wherein the cropping the first image data is cropping the second set of first image data.

26. The imaging system of claim 23, wherein the retrieving the first image data includes retrieving a first set of first image data and wherein the computer-readable media further stores machine readable instructions that, when executed, cause the microprocessor to:
  determine that the second bounding box overlaps with more than a predetermined threshold proportion of the first bounding box;
  responsive to the determining that the second bounding box overlaps with more than the predetermined threshold proportion of the first bounding box, indicate, to a user, to scan the first object again; and
  retrieve a second set of first image data of the first object from the memory;
  wherein the cropping the first image data is cropping the second set of first image data.

27. The imaging system of claim 23, wherein a neural network calculates the coordinates for the first bounding box and calculates the coordinates for the second bounding box, further wherein the computer-readable media further stores machine readable instructions that, when executed, cause the microprocessor to:
  train, using a first labelled dataset, the neural network to calculate the coordinates for the first bounding box; and
  train, using a second labelled dataset, the neural network to calculate the coordinates for the second bounding box.

28. The imaging system of claim 20, wherein the computer-readable media further stores machine readable instructions that, when executed, cause the microprocessor to:
  calculate coordinates for a bounding box at least partially encompassing the first object in the first image data;
  wherein the cropping is based on calculating the coordinates and includes cropping the first image data based on the bounding box.

29. The imaging system of claim 28, wherein a neural network calculates the coordinates for the bounding box and wherein the computer-readable media further stores machine readable instructions that, when executed, cause the microprocessor to:
  train, using a labelled dataset, the neural network to calculate the coordinates of the bounding box.

30. The imaging system of claim 20, wherein the computer-readable media further stores machine readable instructions that, when executed, cause the microprocessor to:
  determine a successful decode of an indicia associated with the second object has occurred;
  wherein the retrieving the one or more support samples from the image database is based on a decoded barcode of the second object.

31. The imaging system of claim 20, wherein the generating the embedding of the first image data includes:
  converting pixels of the first image data into a mathematical array;
  wherein each entry of the mathematical array corresponds to visual details of one or more pixels of the pixels.

32. The imaging system of claim 31, wherein the computer-readable media further stores machine readable instructions that, when executed, cause the microprocessor to:
  responsive to the converting the pixels of the first image data into the mathematical array, compress a size of the mathematical array.

33. The imaging system of claim 31, wherein a neural network converts the pixels of the first image data into the mathematical array, further wherein the computer-readable media further stores machine readable instructions that, when executed, cause the microprocessor to:
  train, using a labelled dataset, the neural network to generate the embedding of the first image data.

34. The imaging system of claim 33, wherein the labelled dataset includes a plurality of sets of training image data, and wherein training the neural network includes:
  receiving designations between a subset of the plurality of sets of training image data based on similarity; and
  determining a distance for each node of the neural network from a seed node based on the designations.

35. The imaging system of claim 20, wherein the computer-readable media further stores machine readable instructions that, when executed, cause the microprocessor to:
  determine, using the embedding of the first image data, whether the first object is covered.

36. The imaging system of claim 35, wherein the first object is covered, the first image data is a first set of first image data, and the embedding of the first image data is a first embedding of the first image data, further wherein the computer-readable media further stores machine readable instructions that, when executed, cause the microprocessor to:
  indicate, to a user, to scan the first object again;
  retrieve a second set of first image data of the detected object from the memory; and
  generate, using the second set of first image data, a second embedding of the second set of first image data;
  wherein the comparing the embedding of the first image data is comparing the second embedding of the second set of first image data.

37. The imaging system of claim 20, wherein the comparing the embedding of the first image data to each support sample of the one or more support samples includes:
  calculating a difference between the embedding of the first image data and each support sample of the one or more support samples; and
  determining whether the difference between the embedding of the first image data and any of the each support sample of the one or more support samples is below a predetermined threshold.

38. The imaging system of claim 37, wherein a neural network compares the embedding of the first image data to each support sample of the one or more support samples, and further wherein the calculating the difference includes:
  calculating a distance between a seed node representing the embedding of the first image data and each node representing each support sample of the one or more support samples.

* * * * *